(12) United States Patent
Stommel

(10) Patent No.: US 7,743,653 B2
(45) Date of Patent: Jun. 29, 2010

(54) METHOD AND DEVICE FOR ADAPTING TIRES OF A MEANS OF LOCOMOTION TO GIVEN TRAVEL SITUATIONS

(75) Inventor: Matthias Stommel, Ganderkesee (DE)

(73) Assignee: Daubner & Stommel Gbr Bau-Werk-Planung (DE)

(*) Notice: Subject to any disclaimer, the term of this patent is extended or adjusted under 35 U.S.C. 154(b) by 281 days.

(21) Appl. No.: 11/904,049

(22) Filed: Sep. 26, 2007

(65) Prior Publication Data
US 2008/0087361 A1 Apr. 17, 2008

(30) Foreign Application Priority Data
Oct. 12, 2006 (DE) ................. 10 2006 048 769

(51) Int. Cl.
*B60C 23/02* (2006.01)
(52) U.S. Cl. .................. 73/146.5; 152/152.1
(58) Field of Classification Search .......... 73/146, 73/146.8; 152/415
See application file for complete search history.

(56) References Cited

U.S. PATENT DOCUMENTS

| | | | |
|---|---|---|---|
| 5,540,268 A | * | 7/1996 | Mittal .................. 152/415 |
| 5,629,874 A | * | 5/1997 | Mittal .................. 702/140 |
| 2006/0190212 A1 | * | 8/2006 | Kobetz ................. 702/138 |
| 2006/0276990 A1 | * | 12/2006 | Abramovitch .......... 702/138 |

FOREIGN PATENT DOCUMENTS

| | | |
|---|---|---|
| DE | 12 00 705 A | 9/1965 |
| DE | 36 14 055 A1 | 10/1987 |
| DE | 196 12 327 A1 | 12/1997 |
| DE | 100 50 215 A1 | 4/2002 |
| DE | 102 02 993 A1 | 7/2003 |
| DE | 102 46 180 A1 | 4/2004 |
| DE | 103 36 330 B3 | 1/2005 |
| GB | 690747 A | 4/1953 |

OTHER PUBLICATIONS

Office action issued in corresponding Canadian Application No. 2603342 dated Sep. 4, 2009.
Notice of the First Office Action from The Patent Office of the People's Republic of China (Oct. 16, 2009).

* cited by examiner

Primary Examiner—Andre J Allen
(74) Attorney, Agent, or Firm—Smith, Gambrell & Russell

(57) ABSTRACT

A method for adapting tires (14) of an, in particular, motor-driven means of locomotion to given travel situations, in particular of a passenger car, of a truck or the like. The shape of at least one tire (14), preferably of a plurality of tires (14) or of all the tires (14), is changed selectively, and preferably automatically, during the journey as a function of the travel situation.

16 Claims, 1 Drawing Sheet

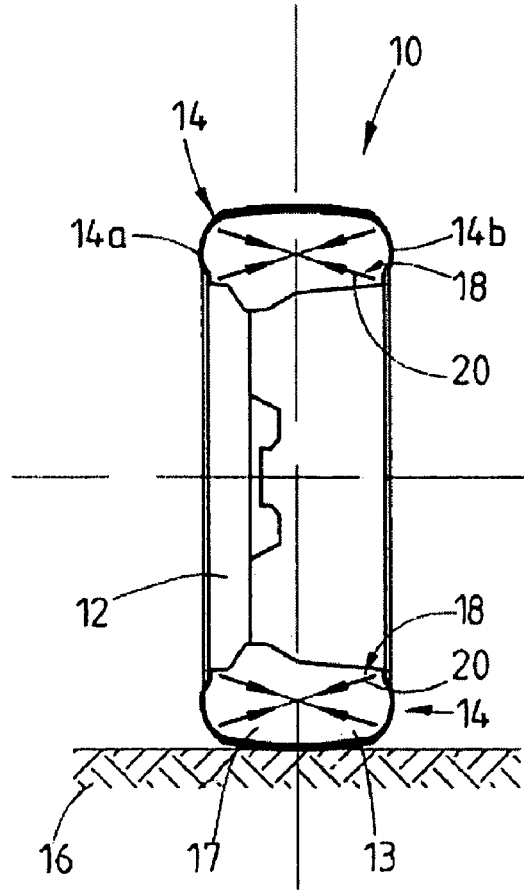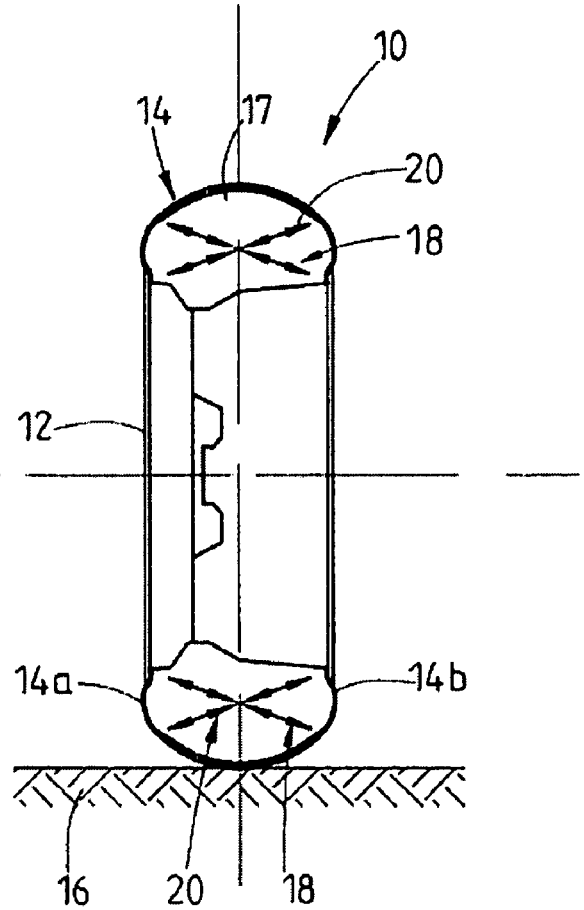

METHOD AND DEVICE FOR ADAPTING TIRES OF A MEANS OF LOCOMOTION TO GIVEN TRAVEL SITUATIONS

STATEMENT OF RELATED APPLICATION

This application is based on and claims convention priority on German Patent Application No. 10 2006 048 769.9 having a filing date of 12 Oct. 2006, and which is incorporated herein by this reference.

BACKGROUND OF THE INVENTION

1. Technical Field

The present invention relates to a method for adapting tires of an, in particular, motor-driven means of locomotion to given travel situations, in particular of a passenger car, of a lorry, of an aircraft or the like. The present invention relates also to a means of locomotion having at least one tire which can be deformed as a function of the travel situation in order to carry out the abovementioned method.

2. Related Art

Tires of means of locomotion such as, for example, passenger cars, lorries, motorcycles, aircraft or the like have various demands placed upon them depending on the travel situation. During braking and acceleration processes it is basically advantageous to make the contact area of the tire, that is to say the area of contact of the tire with the respective underlying surface, as large as possible in order to achieve high friction. In contrast, when travelling straight ahead without such braking or acceleration processes a particularly small tire contact area with minimum frictional resistance is advantageous. In turn, when cornering it is advantageous to have a tire contact area which is as large as possible and has maximum friction in order to be able to compensate lateral forces which cause lateral accelerations.

Tires according to the prior art constitute compromises which attempt to satisfy the abovementioned contradictory requirements as well as possible. In order to bring about the best possible compensation of longitudinal and lateral acceleration forces, tires with a relatively broad tread, and thus a large tire contact area, tend to be used. If tires with relatively narrow tread are used, value is placed correspondingly on straight-ahead travel with friction which is reduced as much as possible.

Motorcycle tires have a specific tire contour which attempts to model the different requirements during straight-ahead travel on the one hand and during cornering on the other. The contour is configured in such a way that the tire contact area, and thus the adhesion of the tire, increases as the motorcycle adopts an increasingly oblique position. However, motorcycle tires are not adapted to different travel situations during straight-ahead travel. The same tire contact area is always effective irrespective of whether the tires are, on the one hand, being braked or accelerated or, on the other, are travelling straight ahead without being braked. This gives rise to the same friction conditions irrespective of whether the tires are accelerated or braked.

BRIEF SUMMARY OF THE INVENTION

Taking this prior art as a basis, the object of the present invention is to specify a method with which the tires of an, in particular, motor-driven means of locomotion, in particular of a passenger car, of a lorry, of a motorcycle, an aircraft or the like, can be adapted to a wide variety of travel situations. Furthermore, an object of the present invention is to specify a means of locomotion which is operated with such a method in order to adapt the tires as a function of the travel situation.

This object is achieved by means of a method for adapting tires of an, in particular, motor-driven means of locomotion to given travel situations, in particular of a passenger car, of a lorry, of an aircraft or the like, characterized in that the shape of at least one tire, preferably of a plurality of tires or of all the tires, is changed selectively, and preferably automatically, during the journey as a function of the travel situation, and a means of locomotion having at least one tire which can be deformed as a function of the travel situation in order to carry out the method for adapting tires, characterized in that the means of locomotion has an open-loop and/or closed-loop control device by means of which the shape of the tire can be adapted, preferably automatically, to the travel situation.

Accordingly, the invention discloses a method for adapting tires of an, in particular, motor-driven means of locomotion to given travel situations, which is characterized in that the shape of at least one tire, preferably of a plurality of tires or of all the tires, is changed selectively, and preferably automatically, during the journey as a function of the travel situation.

Means of locomotion is understood within the scope of application to refer to any driven means of locomotion with or without an engine, in particular vehicles such as for example passenger cars, lorries, motorcycles, bicycles or the like. It is basically conceivable also to adapt tires of aircraft to given travel situations, for example during starting or landing operations, with the method according to the invention.

The shape of the tire is preferably changed according to the invention in such a way that the contact area which is effective during the journey is increased or decreased depending on the travel situation. The changing of the shape of the tire usually becomes apparent particularly in the changing of the tire contour in a cross-sectional view.

In one preferred embodiment of the invention, shape-changing means, on which in particular open-loop and/or closed-loop control can be performed electronically, are assigned to the tire, particularly preferably to the walls of the tire, in order to change the shape of the tire. The shape changing means on which open-loop and/or closed-loop control can be performed are actuated or controlled as a function of the travel situation.

In an alternative, the air pressure or gas pressure within the tire can be raised or lowered, preferably automatically, as a function of the travel situation by means of the shape-changing means. Accordingly, for example, in customary car tires the air pressure in the space which is bounded by the tire and the rim can be raised or lowered. In tires with a hose which is filled with air or gas, the air pressure or gas pressure within the hose is correspondingly raised or lowered. In tires which have a multiplicity of chambers which are filled with air or gas the pressure within these chambers is raised or lowered.

In order to change the tire pressure as a function of the travel situation, the shape-changing means have a compressed air source or compressed gas source which is connected/can be connected to the tire by means of a suitable line system. The compressed air or compressed gas source can be arranged in the interior of the means of locomotion, for example in the engine compartment. If the tire pressure is to be increased, air/gas is fed to the tire from the compressed air/compressed gas source. If the tire pressure is to be lowered, a suitable tire valve via which air/gas can escape from the tire is automatically opened.

As a person skilled in the art recognizes, various possibilities are conceivable for the detailed embodiment of the shape-changing means.

The increase in the air pressure or gas pressure described above, for example in a passenger car tire, leads to a situation in which the tread of the tire is deformed, in particular arched, in such a way that the effective tire contact area is reduced.

In one further embodiment of the invention, the shape-changing means on which in particular open-loop and/or closed-loop control can be performed electronically have traction means which act on the tire. Said traction means can generate, as a function of the travel situation, traction forces, by means of which the sidewalls of the respective tire can be moved towards one another. The sidewalls of the tire are to be moved in such a way that the effective tire contact area is reduced. In a similar way to the above illustrated increase in air pressure within the tire, the traction means cause the tread of the tire to arch outwards.

It is also possible to provide that the shape-changing means have electroactive polymer extrudates which are assigned to the tires and which are preferably integrated into the wall of the tire. The electroactive polymer extrudates can contract or expand when suitable electrical voltages are applied. They are integrated into the wall of the tire in such a way that the activation and/or deactivation of the polymer extrudates brings about the desired change in shape of the tires.

According to the invention, there is also provision that the shape of the tire is changed in such a way that the effective tire contact area is smaller when the means of locomotion is travelling straight ahead without being braked or accelerated than when it is travelling around bends and/or smaller than during braking or acceleration processes. As a result, the friction between the tire and underlying surface is reduced when the means of locomotion is travelling straight ahead. In contrast, when the means of locomotion is cornering and/or during braking or acceleration processes, the friction between the tire and underlying surface is increased in order to be able to compensate as well as possible the forces, in particular longitudinal and lateral forces, which are acting on the tire.

In one particularly advantageous embodiment of the invention, the shape of the tire can be changed as a function of braking processes and/or acceleration processes of the means of locomotion and/or as a function of steering processes. For example, in the case of a passenger car, but also in other means of locomotion, the change in the tire can therefore be dependent on the activation of the acceleration device of the means of locomotion, for example by means of an accelerator pedal, and/or of a brake device and/or of a steering device for steering the tire.

In a further embodiment of the invention, the actual travel situation in which the means of locomotion currently finds itself is sensed by means of suitable sensors. The shape of the tire is adapted as a function of measured values which are measured by means of the sensors and which characterize the actual travel situation.

For example, acceleration sensors which are assigned to the means of locomotion and which can register the acceleration processes and/or braking processes and/or non-accelerated travel movements of the means of locomotion can be used as sensors. Furthermore it is alternatively or additionally conceivable to sense the underlying surface on which the means of locomotion is located. In this context, the quality of the underlying surface can preferably be sensed. This sensing of the underlying surface can be carried out in front of the means of locomotion, for example by means of cameras or other suitable sensors.

As a person skilled in the art is aware, there are a multiplicity of possibilities for directly or indirectly sensing the actual travel situation.

Furthermore it is possible to provide for open-loop and/or closed-loop control to be performed on the shape-changing means as a function of signals generated by a distance warning device. For example when a distance measured between the means of locomotion and an obstacle, for example between a further means of locomotion travelling in front of the means of locomotion, is smaller than or equal to a predetermined minimum value, the shape of the tire is changed. In this case the tire contact area is preferably automatically increased in order to make available sufficient frictional area for a possible imminent braking process. If the distance from the obstacle is subsequently increased again, the tire contact area can be reduced again.

The method according to the invention for adapting a tire can be integrated into a corresponding means of locomotion in various ways. The important factor is that the means of locomotion has an open-loop and/or closed-loop control device by means of which the shape of the tire can be adapted, preferably automatically, to the travel situation.

A suitable open-loop and/or closed-loop control device can have, in one simple variant, a control device which can be activated by a user during travel. With such a control device the user could perform open-loop control on the above described shape-changing means individually as a function of the travel situation and said means could then change the shape of the tire.

However, an open-loop and/or closed-loop control device with which the shape of the tire can be adapted automatically to the travel situation is particularly preferred.

Finally, energy-generating means which are based on an induction effect can be assigned to the tire in order to supply one or more components of the shape-changing means and/or of the open-loop and/or of closed-loop control device with electrical energy. The energy-generating means will use here the rotational energy of the tires while the means of locomotion is travelling in order to generate energy, for example by means of a coil which rotates in relation to a magnet. For example, one or more electrical conductors, for example electrically conductive loops which rotate when the tire rotates in relation to magnets arranged in wheel boxes of the means of locomotion, can be arranged in the tire. Electrical energy can be generated in a known fashion by means of the relative movement between the electrical conductor and a magnet.

BRIEF SUMMARY OF THE DRAWINGS

Further features of the present invention emerge from the appended claims, the subsequent description of a preferred exemplary embodiment and the appended drawings, in which:

FIG. 1a shows a wheel of a means of locomotion with a tire which can be adapted according to the invention, in a cross-sectional view.

FIG. 1b shows the tire from FIG. 1a with a tire shape which is adapted to a changed travel situation.

DETAILED DESCRIPTION OF PREFERRED EMBODIMENTS

FIG. 1a shows a cross-sectional view of a tire 10 of a means of locomotion (not illustrated), specifically a passenger car. The wheel 10 has a rim 12 and a tire 14 which is connected in a customary fashion to the rim 12.

The tire 14 is filled with air. As is apparent from FIG. 1a, a section 13 of the tire 14 is virtually completely in contact with an underlying surface 16 on which the means of locomotion can travel. The section 13 of the tire 14 usually has a profile 17 and is also referred to as tread. In tires according to the prior art, a large part of the tread 13 is frequently on the underlying surface 16 in virtually any travel situation.

However, irrespective of the permanently defined tread 13 of the tire 14, in extreme travel situations basically only part of the tread 13 or a region of the tire 14 which is different from the tread 13 can effectively rest on the underlying surface 16. That part of the tire 14 or of the tread 13 which actually enters into contact with the underlying surface 16 in the respective travel situation is referred to as the tire contact area. The tire contact area which is effective or actually active can be smaller or larger than the tread 13, can correspond to it or else can differ from it.

Shape-changing means 18 which serve to change the shape of the tire 14, in particular its contour, in a selective fashion are arranged within the tire 14. The shape-changing means 18 are illustrated only schematically. They have traction means 20 by means of which the lateral tire walls 14a and 14b can be moved towards one another. For this purpose, the traction means 20 engage with their respective ends on the sidewalls 14a, 14b.

In the situation illustrated in FIG. 1a, the shape-changing means 18 are set in such a way that a particularly large tire contact area is produced. The entire tread 13 of the tire 14 enters into contact with the underlying surface 16. This leads to a high degree of friction between the tire 14 and underlying surface 16. Such a high degree of friction is usually desired during acceleration or braking processes of the passenger car. In addition, such a large tire contact area is advantageous when cornering.

In contrast, FIG. 1b shows the tire 14 in a state in which the sidewalls 14a, 14b have been moved towards one another by means of the shape-changing means 18. As is clearly apparent, this causes the tread 13 of the tire 14 to arch so that a tire contact area which is significantly reduced compared to the situation from FIG. 1a is produced. Only part of the tread 13 is in contact with the underlying surface 16. This leads to significantly reduced friction which can be desired, for example, at high speeds without braking or acceleration processes.

In one development of the invention, those outer regions of the tread 13 which mainly come into contact with the underlying surface 16 during braking and/or acceleration processes and/or during cornering are formed from a different material with a coefficient of friction in relation to the underlying surface which is lower than the inner regions of the tread 13 which also come into contact with the underlying surface 16 during straight-ahead travel without acceleration or braking. Alternatively or additionally, the outer tread regions can also have a different profile than the inner tread regions.

In one of a large number of possible embodiments of the invention, a sensor device which is assigned to the means of locomotion, that is to say the passenger car, detects the respective travel situation. As a function of the acquired measured values, open-loop and/or closed-loop control is performed on the shape-changing means 18 by means of suitable open-loop and/or closed-loop control devices.

However it is also possible to provide for open-loop and/or closed-loop control to be performed on the shape-changing means 18 directly as a function of steering movements of the wheels 10 which are carried out by a user or as a function of braking or acceleration processes which are initiated by the user.

As a person skilled in the art is aware, various possibilities are conceivable here.

LIST OF REFERENCE NUMERALS

10 Wheel
12 Rim
13 Tread
14 Tire
14a Lateral wall of the tire
14b Lateral wall of the tire
16 Underlying surface
17 Profile
18 Shape-changing means
20 Traction means

What is claimed is:

1. A method for adapting tires of a motor-driven means of locomotion to given travel situations, comprising the step of selectively changing the shape of at least one tire (14) during a journey as a function of the travel situation, wherein:
   the shape of the at least one tire (14) is changed by performing open-loop and/or closed-loop control of shape-changing means (18) which are assigned to the at least one tire (14), and on which the open-loop and/or closed-loop control is performed electronically, and
   the shape-changing means on which the open-loop and/or closed-loop control is performed have traction means (20) that act on the at least one tire (14) and with which traction forces, by means of which sidewalls (14a, 14b) of the at least one tire (14) are moved towards one another, are generated as a function of the travel situation.

2. The method according to claim 1, wherein the shape of the at least one tire (14) is changed in such a way that the tire contact area which is effective during the journey is increased or decreased depending on the travel situation.

3. The method according to claim 1, wherein the shape of the at least one tire (14) is changed by means of the shape-changing means on which the open-loop and/or closed-loop control is performed, said change being carried out by raising or lowering air pressure or gas pressure within the at least one tire (14) as a function of the travel situation.

4. The method according to claim 1, wherein the shape of the at least one tire (14) is changed in such a way that the effective tire contact area of the at least one tire (14) is smaller when the means (18) of locomotion is travelling straight ahead without being braked or accelerated than when the means (18) of locomotion is travelling around bends and/or during braking or acceleration processes.

5. The method according to claim 1, wherein the shape of the at least one tire (14) is changed as a function of braking and/or acceleration processes and/or as a function of steering processes.

6. The method according to claim 1, wherein the actual travel situation is sensed by means of suitable sensors.

7. A means of locomotion having a tire (14) that can be deformed as a function of a travel situation in order to adapt tires of a motor-driven means of locomotion to given travel situations so as to selectively change the shape of the tire (14) during a journey as a function of the travel situation, wherein:
   the means of locomotion comprises an open-loop and/or closed-loop control device by means of which the shape of the tire (14) is adapted to the travel situations;
   the shape-changing means on which the open-loop and/or closed-loop control is performed have traction means (20) that act on the tire (14) and with which traction forces, by means of which sidewalls (14a, 14b) of the tire (14) are moved towards one another, are generated as a function of the travel situation; and the traction means (20) are embodied in such a way that the traction forces by means of which the sidewalls (14a, 14b) of the tire (14) are moved towards one another are generated as a function of the travel situation.

8. The means of locomotion according to claim 7, wherein the traction means (20) act on the sidewalls (14a, 14b) of the tire (14).

9. The means of locomotion according to claim 7, wherein the shape-changing means (18) have polymer extrudates which are assigned to the tires and which are integrated into the sidewalls (14a, 14b) of the tire (14).

10. The means of locomotion according to claim 7, wherein energy-generating means which are based on an induction effect are arranged in the tire (14) in order to supply the shape-changing means (18) and/or the open-loop and/or closed-loop control device with electrical energy.

11. The means of locomotion according to claim 7, wherein tread (13) of the tire (14) has at least two different sections which are each formed from material with different coefficients of friction relative to an underlying surface and/or have different profiles.

12. The means of locomotion according to claim 11, wherein at least one section of the tread (13), which is on the outside in a cross-sectional view of the tread (13), is formed from a material with a coefficient of friction which is relatively high compared to the underlying surface (16), and at least one tread section, which is on the inside in a cross-sectional view of the tread (13), is formed from a material with a coefficient of friction which is relatively low compared to the underlying surface (16).

13. The method as claimed in claim 1, wherein the means of locomotion is selected from the group consisting passenger cars, trucks, motorcycles, and aircraft.

14. The method as claimed in claim 1, wherein the shape of the at least one tire (14) is changed automatically.

15. The method as claimed in claim 1, wherein the shape-changing means (18) is located on the sidewalls of the tire (14a, 14b).

16. The method as claimed in claim 4, wherein the air pressure or gas pressure within the at least one tire (14) is within a tire hose chamber which is arranged in the at least one tire (14).

* * * * *